US011588807B2

(12) United States Patent
Koike

(10) Patent No.: US 11,588,807 B2
(45) Date of Patent: Feb. 21, 2023

(54) INFORMATION PROCESSING APPARATUS AND NON-TRANSITORY COMPUTER READABLE MEDIUM

(71) Applicant: FUJIFILM BUSINESS INNOVATION CORP., Tokyo (JP)

(72) Inventor: Masamichi Koike, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 122 days.

(21) Appl. No.: 16/819,716

(22) Filed: Mar. 16, 2020

(65) Prior Publication Data
US 2021/0021586 A1 Jan. 21, 2021

(30) Foreign Application Priority Data

Jul. 16, 2019 (JP) .............................. JP2019-130930

(51) Int. Cl.
*H04L 9/40* (2022.01)
(52) U.S. Cl.
CPC ........ *H04L 63/0823* (2013.01); *H04L 63/123* (2013.01)
(58) Field of Classification Search
CPC .............. H04L 63/0823; H04L 63/123; H04L 67/32; H04L 9/3263
See application file for complete search history.

(56) References Cited

U.S. PATENT DOCUMENTS

| 5,922,074 A * | 7/1999 | Richard ................... H04L 61/15 726/21 |
| 6,223,291 B1* | 4/2001 | Puhi ......................... G06F 21/10 726/28 |
| 7,503,074 B2* | 3/2009 | Dublish ................... H04L 67/18 726/27 |
| 8,010,786 B1* | 8/2011 | Ward ....................... H04L 63/20 713/156 |
| 8,332,928 B2* | 12/2012 | Ibrahim ................. H04L 63/107 726/17 |
| 8,627,422 B2* | 1/2014 | Hawkes ................ H04W 12/06 726/5 |
| 9,038,158 B1* | 5/2015 | MacKay ................. H04W 4/80 726/10 |
| 9,742,569 B2* | 8/2017 | van Roermund ... H04W 12/069 |
| 10,645,094 B2* | 5/2020 | Fynaardt ............... H04W 12/06 |

(Continued)

FOREIGN PATENT DOCUMENTS

JP 2002-305531 A 10/2002

OTHER PUBLICATIONS

Hasrouny, Hamssa, et al. "Trust model for secure group leader-based communications in VANET." Wireless Networks 25.8 (2019):4639-4661. (Year: 2019).*

(Continued)

*Primary Examiner* — Jung W Kim
*Assistant Examiner* — Sameera Wickramasuriya
(74) *Attorney, Agent, or Firm* — Oliff PLC

(57) ABSTRACT

An information processing apparatus includes a processor programmed to: detect a request submitted from a terminal to an external server providing a service; and upon a determination that the detected request is submitted from the terminal located in a base, transmit a validation request for validating a certificate of the terminal to a CRL distribution server in which the certificate of the terminal is invalid.

9 Claims, 6 Drawing Sheets

(56) References Cited

U.S. PATENT DOCUMENTS

| | | | | |
|---|---|---|---|---|
| 2002/0165824 | A1* | 11/2002 | Micali | G06Q 20/38215 |
| | | | | 705/76 |
| 2003/0037234 | A1* | 2/2003 | Fu | H04L 9/3268 |
| | | | | 713/158 |
| 2003/0131259 | A1* | 7/2003 | Barton | H04L 63/0464 |
| | | | | 726/12 |
| 2004/0008666 | A1* | 1/2004 | Hardjono | H04L 63/0869 |
| | | | | 370/352 |
| 2004/0111634 | A1* | 6/2004 | Ingman | H04L 63/105 |
| | | | | 713/166 |
| 2005/0228998 | A1* | 10/2005 | Chan | H04L 9/3268 |
| | | | | 713/175 |
| 2008/0244264 | A1* | 10/2008 | Umezawa | H04L 63/0823 |
| | | | | 713/158 |
| 2009/0187983 | A1* | 7/2009 | Zerfos | H04L 63/0823 |
| | | | | 726/10 |
| 2009/0235071 | A1* | 9/2009 | Bellur | H04W 12/082 |
| | | | | 713/158 |
| 2009/0319796 | A1* | 12/2009 | Kim | H04L 63/0823 |
| | | | | 713/176 |
| 2010/0318791 | A1* | 12/2010 | Shamsaasef | H04L 9/3268 |
| | | | | 713/158 |
| 2011/0213965 | A1* | 9/2011 | Fu | H04L 9/3213 |
| | | | | 713/158 |
| 2012/0124673 | A1* | 5/2012 | Zhang | H04L 63/107 |
| | | | | 726/17 |
| 2013/0067220 | A1* | 3/2013 | Ando | H04L 67/12 |
| | | | | 713/156 |
| 2014/0303881 | A1* | 10/2014 | Ando | H04L 63/0823 |
| | | | | 701/117 |
| 2015/0271154 | A1* | 9/2015 | Ronca | H04L 9/3268 |
| | | | | 713/168 |
| 2018/0167790 | A1* | 6/2018 | Cavalcanti | H04L 63/0281 |

OTHER PUBLICATIONS

J. M. A. Calero, N. Edwards, J. Kirschnick, L. Wilcock and M. Wray, "Toward a Multi-Tenancy Authorization System for Cloud Services," in IEEE Security & Privacy, vol. 8, No. 6, pp. 48-55, Nov.-Dec. 2010, doi: 10.1109/MSP.2010.194. (Year: 2010).*

Ying Chen et al., "Location aware messaging—integrating LBS middleware and converged services," IEEE International Conference on e-Business Engineering (ICEBE'05), 2005, pp. 419-426, doi: 10.1109/ICEBE.2005.81. (Year: 2005).*

* cited by examiner

INFORMATION PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2019-130930 filed Jul. 16, 2019.

BACKGROUND

(i) Technical Field

The present disclosure relates to an information processing apparatus and a non-transitory computer readable medium.

(ii) Related Art

Japanese Unexamined Patent Application Publication No. 2002-305531 aims to provide a network technique which enables a user to operate a server by using a dynamic IP address by automatically registering the dynamic IP address to a given domain name system (DNS) in response to assignment of the dynamic IP address. Japanese Unexamined Patent Application Publication No. 2002-305531 discloses the following technique: an address assignment detection-and-registration unit detects a dynamic IP address assigned as a client system; the IP address is notified to a dynamic DNS server system over the Internet; in the dynamic DNS server system, an authentication-and-DNS update unit of an operation management server authenticates the server box of the transmission source and registers the IP address, which is notified from the server box, to the DNS in association with a given domain name for the server box having been authenticated.

In a terminal's use of a server, the configuration, in which the terminal's certificate is simply authenticated, causes the terminal to be capable of using the server as long as the certificate is valid. Thus, the terminal may use the server from the outside, which is a place incapable of being managed, of a base.

SUMMARY

Aspects of non-limiting embodiments of the present disclosure relate to an information processing apparatus and a non-transitory computer readable medium which may introduce a restriction that, in a terminal's use of a server, only a terminal in a base is permitted to use the server.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus includes a processor programmed to: detect a request submitted from a terminal to an external server providing a service; and upon a determination that the detected request is submitted from the terminal located in a base, transmit a validation request for validating a certificate of the terminal to a CRL distribution server in which the certificate of the terminal is invalid.

BRIEF DESCRIPTION OF THE DRAWINGS

Exemplary embodiment of the present disclosure will be described in detail based on the following figures, wherein.

DETAILED DESCRIPTION

A suitable exemplary embodiment for implementing the present disclosure will be described below on the basis of the drawings.

Figure 1:
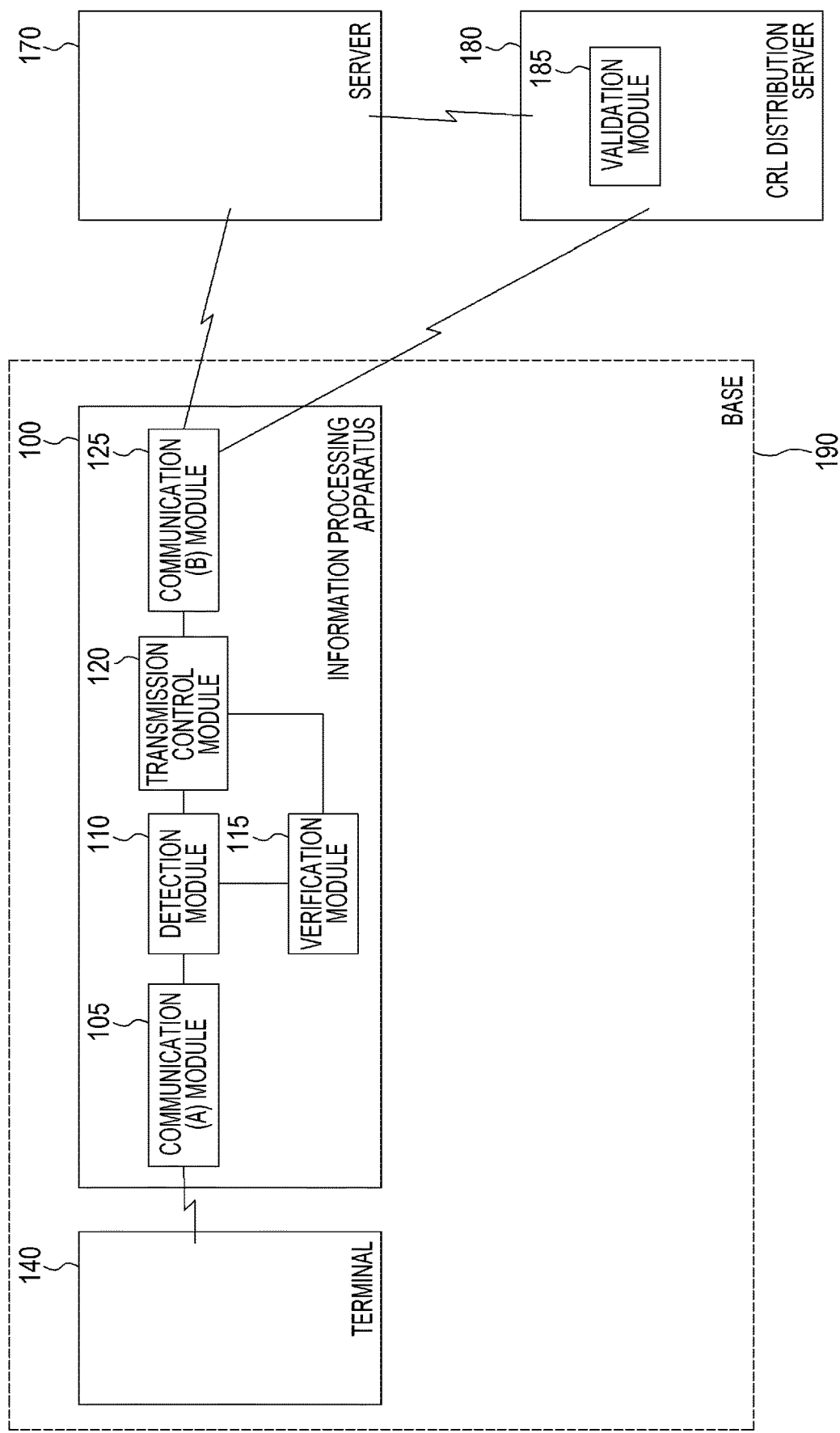
FIG. 1 is a schematic diagram illustrating an exemplary module configuration according to the present exemplary embodiment.

FIG. 1 is a schematic diagram illustrating an exemplary module configuration of the present exemplary embodiment.

In general, a module refers to a component, such as software (including a computer program as an interpretation of "software"), which is logically separable, or hardware. Thus, a module in the present exemplary embodiment refers to not only a module in terms of a computer program but also a module in terms of a hardware configuration. Consequently, the present exemplary embodiment also describes a system, a method, and a computer program for functioning as a module (for example, a program that causes a computer to execute procedures, a program that causes a computer to function as units, or a program that causes a computer to implement functions). For convenience of explanation, the terms "to store something" and "to cause something to store something", and their equivalent terms are used. When the present exemplary embodiment is implemented by using computer programs, these terms mean that a storage device stores something or that a storage device is controlled so as to store something. One module may correspond to one function. However, in the implementation, one program may constitute one module, or one program may constitute multiple modules. In contrast, multiple programs may constitute a single module. Additionally, multiple modules may be executed by a single computer, or one module may be executed by multiple computers in a distributed or parallel processing environment. One module may include another module. Hereinafter, the term "connect" refers to logical connection, such as transmission/reception of data, an instruction, reference relationship between pieces of data, or login, as well as physical connection. The term "predetermined" refers to a state in which determination has been made before a target process. This term also includes a meaning in which determination has been made in accordance with the situation or state at that time or the situation or state before that time, not only before the process according to the present exemplary embodiment starts, but also before the target process starts even after the process according to the present exemplary embodiment has started. When there are multiple "predetermined values", these may be different from each other, or two or more of the values (the two or more of the values include all values, of course) may be the same. A description of "when A is satisfied, B is performed" is used as having a meaning of "Whether or not A is satisfied is determined and, when it is determined that A is satisfied, B is performed." However, this term does not include the case where the determination as to whether or not A is satisfied is unnecessary. In addition, the case in which things are listed, such as "A, B, and C", indicates exemplary listing unless otherwise noted, and includes the case in which only one member is selected (for example, only A).

A system or apparatus refers to one in which multiple computers, pieces of hardware, devices, and the like are connected to each other by using a communication unit such as a network (the "network" includes one-to-one communication connection), and also refers to one which is implemented by using a computer, a piece of hardware, a device, or the like. The terms "apparatus" and "system" are used as terms that are equivalent to each other. As a matter of course, the term "system" does not include what is nothing more than a social "mechanism" (that is, a social system) operating on man-made agreements.

For each of the processes performed by the respective modules, or for each of the processes if the processes are performed in a single module, target information is read out from a storage device. After the process is performed, the processing result is written in a storage device. Accordingly, description about the reading of data from the storage device before the process and the writing into the storage device after the process may be skipped. Examples of the storage device may include a hard disk drive, a random access memory (RAM), an external storage medium, a storage apparatus via a communication line, and a register in a central processing unit (CPU).

As illustrated in the example in FIG. 1, an information processing apparatus 100 according to the present exemplary embodiment, which has a communication relay capability, includes a communication (A) module 105, a detection module 110, a verification module 115, a transmission control module 120, and a communication (B) module 125. In particular, the information processing apparatus 100 performs processes related to certification of a certificate. If a terminal 140 is to use a service, which is provided by an external server 170, through the information processing apparatus 100, the service may be used. If the service is used not through the information processing apparatus 100, the service may not be used. For example, a cloud service (an example of service provided by the server 170) is prohibited from being used not through the information processing apparatus 100. Specifically, this prevents the terminal 140 from using a cloud service from the outside of a base.

The information processing apparatus 100 relays communication between the terminal 140, which is located in a base 190, and the server 170 which is located in the outside. Thus, in order that the terminal 140 uses the server 170 located in the outside, the terminal 140 needs the information processing apparatus 100 serving as an intermediary. That is, the terminal 140 located in the base 190 is not capable of being connected to the server 170, which is located in the outside, without the information processing apparatus 100 serving as an intermediary.

The information processing apparatus 100 and the terminal 140 are located in the base 190. As a matter of course, there may be multiple terminals 140 connected to the information processing apparatus 100 communicatively.

Under this environment, when the terminal 140 is to use a service provided by the server 170, a request from the terminal 140 to the server 170 is relayed by the information processing apparatus 100. Use of the service involves the server 170 verifying the certificate of the terminal 140. The server 170 uses a certificate-revocation-list (CRL) distribution server 180 to verify the certificate of the terminal 140. If the certificate is valid, the service may be used. If the certificate is invalid, the service may not be used. The term "invalidity" is used as a concept including revocation. For example, a certificate is typically revoked due to erroneous issue of a certificate, loss of the secret key of a certificate, or the like. In the present exemplary embodiment, the certificate is made invalid in the normal state in order to prohibit the terminal 140, which is located outside the base 190, from accessing the server 170. The invalidation in the present exemplary embodiment is temporary invalidation (including a concept of "hold") which may be switched to validation later.

In the case where the terminal 140 is portable, the terminal 140 may be used outside the base 190. In this case, in a location outside the base 190, the terminal 140 is not allowed to use a service provided by the server 170. That is, the process of the information processing apparatus 100 does not allow the terminal 140 to use a service provided by the server 170 without the information processing apparatus 100 serving as an intermediary.

The server 170 is connected to the communication (B) module 125 of the information processing apparatus 100 and the CRL distribution server 180 through communication lines. The server 170, which provides a service in response to a request from the terminal 140, verifies (or authenticates) the certificate of the terminal 140, having transmitted the request, on reception of the request. If the certificate of the terminal 140 is valid, the server 170 provides the service. If the certificate of the terminal 140 is invalid, the server 170 does not provide the service to the terminal 140. For example, the server 170 corresponds to a cloud service server. The server 170 is a typical apparatus providing a service, and it is not necessary to introduce a specific apparatus compatible with the information processing apparatus 100.

The CRL distribution server 180, which has a validation module 185, is connected to the communication (B) module 125 of the information processing apparatus 100 and the server 170 through communication lines. The CRL distribution server 180, which manages certificate revocation lists (hereinafter referred to as CRLs), has CRLs which are lists of invalidated certificates.

In the CRL distribution server 180, the certificate of the terminal 140 is invalid in the initial state. Thus, when a certificate is transmitted not through the information processing apparatus 100, for example, when the terminal 140 is used outside abase of a company and a request and the certificate are transmitted to the server 170, the server 170 determines that the certificate is invalid, and does not provide a service. That is, the terminal 140 located outside a base of a company fails to receive provision of the service.

The validation module 185 validates a target certificate in response to a validation request from the information processing apparatus 100. That is, the validation module 185 deletes the certificate from a CRL. In contrast, the validation module 185 invalidates a target certificate in response to an invalidation request from the information processing apparatus 100. That is, the validation module 185 adds the certificate to the CRL.

The terminal 140 is connected to the communication (A) module 105 of the information processing apparatus 100 through a communication line. The terminal 140 located in the base 190 communicates with the external server 170 through the information processing apparatus 100. In particular, to use a service provided by the server 170, the terminal 140 transmits a request, for using the service, and the certificate of the terminal 140 through the information processing apparatus 100 to the server 170.

The modules in the information processing apparatus 100 will be described.

The communication (A) module 105 is connected to the detection module 110, and is connected to the terminal 140 through the communication line. The communication (A) module 105 communicates with the terminal 140. For example, the communication (A) module 105 receives a request and the certificate which are to be transmitted to the server 170 from the terminal 140. The request herein is a request for using a service provided by the server 170. At that time, the certificate of the terminal 140 is necessary. Thus, the communication (A) module 105 receives a request and the certificate. A request and the certificate may be received at the same time, or may be received at different times. For example, after a request is received, the certificate may be received.

The detection module 110 is connected to the communication (A) module 105, the verification module 115, and the transmission control module 120. The detection module 110 detects a request which is to be transmitted to an outside server 170 providing a service and which is submitted from the terminal 140 located in the base 190. For example, the detection module 110, which has a list of outside servers 170 in advance, may determine whether or not a request from the terminal 140 is a request to a server 170 in the list. Examples of a list of servers 170 include a list describing the Uniform Resource Locators (URLs) of the servers 170.

The detection module 110 may detect a request received by the communication (A) module 105.

The verification module 115 is connected to the detection module 110 and the transmission control module 120. The verification module 115 uses a certificate, which is received by the communication (A) module 105, to verify that the terminal 140 is managed by the information processing apparatus 100.

The transmission control module 120 is connected to the detection module 110, the verification module 115, and the communication (B) module 125. The transmission control module 120 transmits a validation request, for validating the certificate of the terminal 140, to the CRL distribution server 180 in which the certificate of the terminal 140 is invalid. That is, the certificate of the terminal 140 is invalid in the CRL distribution server 180 in the normal state. Just before the terminal 140 receives a service provided by the server 170, the validation request is transmitted to the CRL distribution server 180 so that the target certificate is validated. After that, when the server 170 verifies the certificate which is valid, the server 170 may provide a service corresponding to the request which is transmitted from the terminal 140 through the information processing apparatus 100.

After transmitting the validation request to the CRL distribution server 180, the transmission control module 120 may transmit, to the server 170, the request and the certificate which are received from the terminal 140.

When the verification module 115 verifies that the terminal 140, which has transmitted the request, is managed by the information processing apparatus 100, the transmission control module 120 transmits the validation request to the CRL distribution server 180. As a matter of course, when the verification module 115 verifies that the terminal 140 is not managed by the information processing apparatus 100, the transmission control module 120 does not transmit the validation request to the CRL distribution server 180.

The transmission control module 120 may transmit, to the CRL distribution server 180, an invalidation request for invalidating the certificate of a terminal managed by the information processing apparatus 100.

In particular, when the certificate is in the initial state, the transmission control module 120 may transmit the invalidation request.

The description "When a certificate is in the initial state" is provided so that the certificate is validated under the condition that the information processing apparatus 100 transmits a request, for validating the certificate, to the CRL distribution server 180. For example, when a certificate is created, the invalidation request on the certificate may be transmitted to the CRL distribution server 180.

After the server 170 finishes providing a service, the transmission control module 120 may transmit an invalidation request to the CRL distribution server 180. This operation is performed so that, for reception of a service next time and every time thereafter, a connection to the server through the information processing apparatus needs to be used. For example, the state in which "the server 170 finishes providing a service" is detected by detecting the case in which communication between the terminal 140 and the server 170 ends, the case in which a signal indicating the end of the process for a service is received from the server 170, or the like.

The communication (B) module 125 is connected to the transmission control module 120, and is also connected to the server 170 and the CRL distribution server 180 through the communication lines. The communication (B) module 125 communicates with the server 170 and the CRL distribution server 180. For example, according to an instruction from the transmission control module 120, the communication (B) module 125 transmits a request, which is submitted from the terminal 140 to the server 170, and the certificate. In addition, according to an instruction from the transmission control module 120, the communication (B) module 125 transmits, to the CRL distribution server 180, a validation request or an invalidation request on the certificate of the terminal 140.

Figure 2:
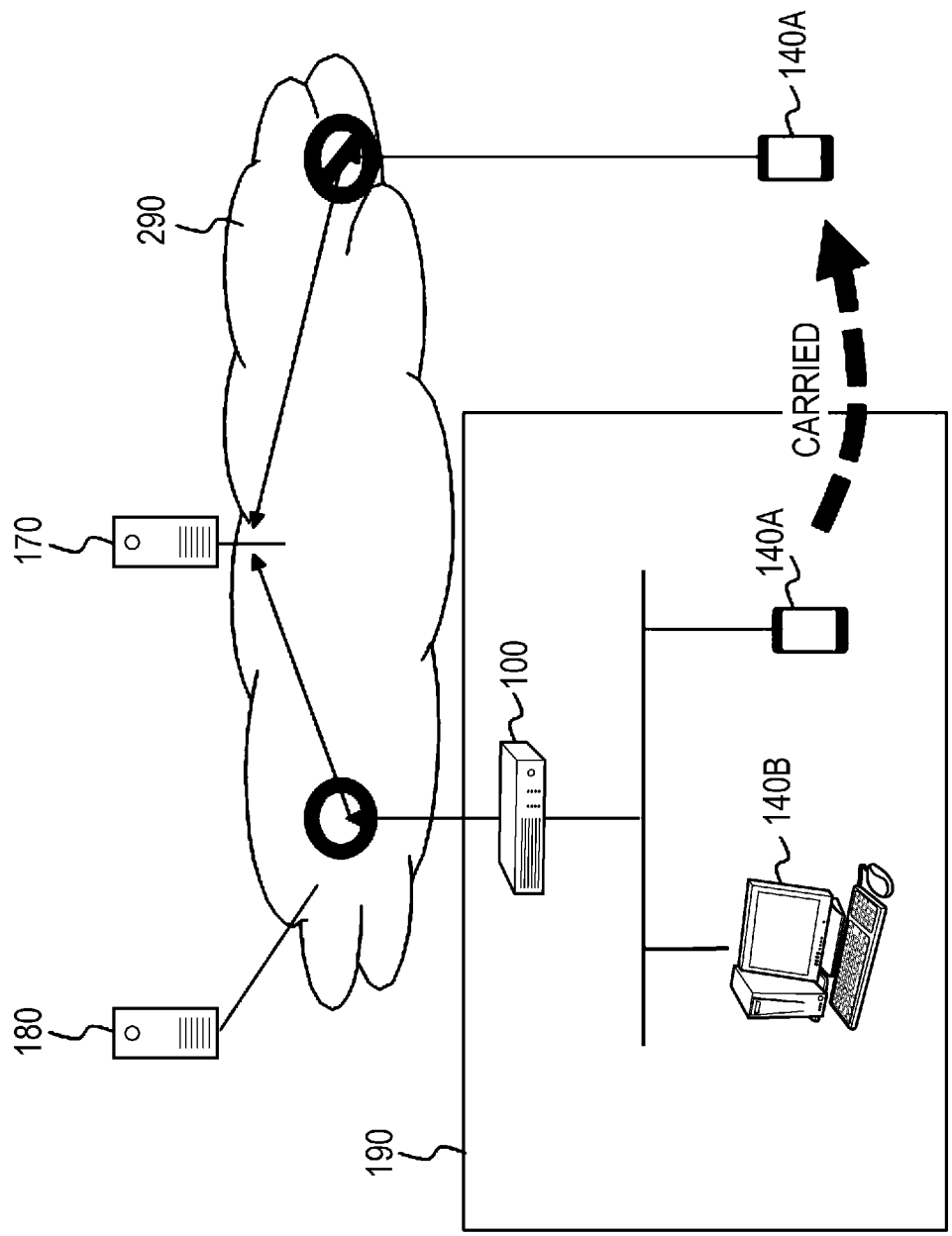
FIG. 2 is a diagram for describing an exemplary system configuration using the present exemplary embodiment.

FIG. 2 is a diagram for describing an exemplary system configuration using the present exemplary embodiment.

The information processing apparatus 100 has the functions of a gateway apparatus.

Description will be made by taking a cloud service server as an example of the server 170.

In the base 190, for example, the information processing apparatus 100, a terminal 140A, and a terminal 140B are present. The information processing apparatus 100, the terminal 140A, and the terminal 140B are connected to each other through a communication line in the base 190.

The information processing apparatus 100, the server 170, and the CRL distribution server 180 are connected to each other through a communication line 290. The communication line 290 may be wireless, wired or a combination of these, and may be, for example, the Internet as a communication infrastructure.

When a company uses an external cloud service, the company may want to restrict use, which is incapable of being managed and monitored by the company, of the cloud service from the outside of abase of the company. However, a client certificate is valid for a cloud service, which performs authentication using the client certificate, regardless of where the cloud service is used. Thus, the service may be used in the outside of a base of the company.

The present exemplary embodiment enables use of a cloud service from the outside of abase to be restricted, when a company performs client authentication using a client certificate.

For example, as illustrated in FIG. 2, in the case where the terminal 140A is a portable information terminal, the terminal 140A may be used not only in the base 190 but also in the outside of the base 190. In the case where the terminal 140A and the terminal 140B are present in the base 190, the information processing apparatus 100 causes the terminal 140A and the terminal 140B to use a cloud service provided by the server 170. In the case where a cloud service provided by the server 170 is to be used by the terminal 140A, which has been carried to the outside, in the outside of the base 190, the information processing apparatus 100 causes the terminal 140A not to use the cloud service.

Thus, a process described in the example below is performed.

The information processing apparatus 100 causes, in advance, the CRL distribution server 180 to revoke the certificates of the terminal 140A and the terminal 140B for use of a cloud service of the server 170. Specifically, identification information of their certificates is registered in the CRL managed by the CRL distribution server 180.

When a terminal 140 in the base 190 of a company is to use a cloud service of the server 170, the information processing apparatus 100 detects the access. If use of a cloud service is permitted, a request for validating the client certificate is transmitted to the CRL distribution server 180. In this way, the server 170 may determine that the client certificate is valid. Thus, the cloud service may be used. After use of the cloud service is finished, the information processing apparatus 100 causes the client certificate, which has been validated, to be revoked.

In the case of use from the terminal 140A in the outside of the base 190, since the process is performed not through the information processing apparatus 100, there is no request for validating the client certificate of the terminal 140A. Accordingly, the client certificate remains revoked, resulting in a failure of access from the terminal 140A.

Figure 3:
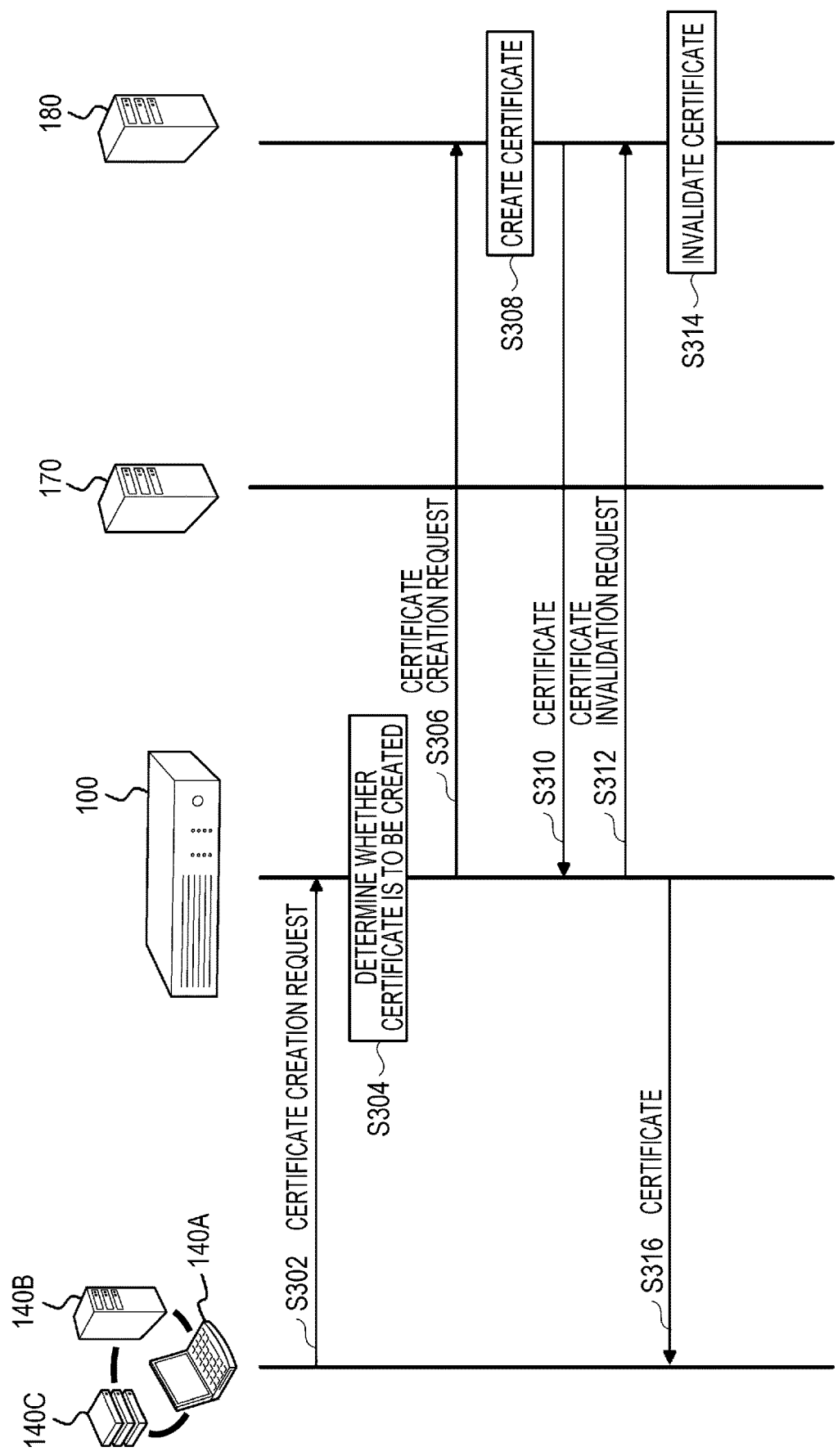
FIG. 3 is a flowchart of an exemplary process according to the present exemplary embodiment.

FIG. 3 is a flowchart of an exemplary process according to the present exemplary embodiment. FIG. 3 illustrates an exemplary process of creating a certificate.

In step S302, a terminal 140 transmits a certificate creation request to the information processing apparatus 100.

In step S304, the information processing apparatus 100 determines whether or not a certificate is to be created. For example, the information processing apparatus 100 determines whether or not the terminal 140 is included in a list of apparatuses located in the base 190. If the terminal 140 is included in the list, the information processing apparatus 100 permits creation of a certificate. If the terminal 140 is not included in the list, the information processing apparatus 100 does not permit creation of a certificate.

In step S306, the information processing apparatus 100 transmits a certificate creation request to the CRL distribution server 180.

In step S308, the CRL distribution server 180 creates a certificate.

In step S310, the CRL distribution server 180 transmits the certificate to the information processing apparatus 100.

In step S312, the information processing apparatus 100 transmits a certificate invalidation request to the CRL distribution server 180. That is, in the initial state of the certificate, the certificate is invalid.

In step S314, the CRL distribution server 180 invalidates the certificate in response to the certificate invalidation request.

In step S316, the information processing apparatus 100 transmits the certificate to the terminal 140.

Figure 4:
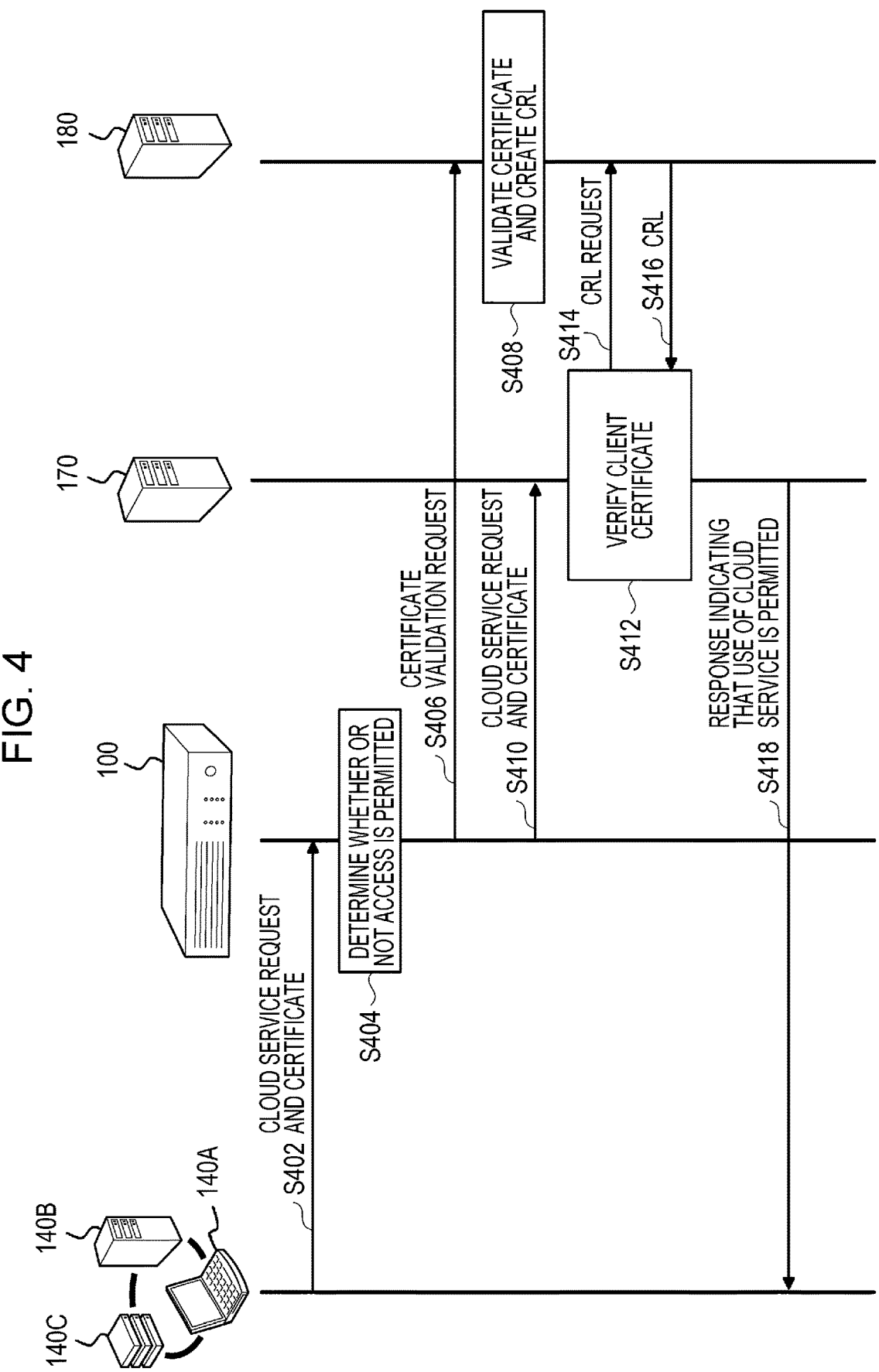
FIG. 4 is a flowchart of an exemplary process according to the present exemplary embodiment.

FIG. 4 is a flowchart of an exemplary process according to the present exemplary embodiment. FIG. 4 illustrates an exemplary process in which a terminal 140 transmits, to the server 170, a request for use of a service.

In step S402, the terminal 140 transmits a cloud service request and the certificate to the information processing apparatus 100.

In step S404, the information processing apparatus 100 determines whether or not the access is permitted. The information processing apparatus 100 determines whether or not the terminal 140 is permitted to access the server 170. For example, a list of terminals 140, which are permitted to access the server 170, among the terminals 140 in the base 190 may be generated in advance. Then, the information processing apparatus 100 may determine whether or not the terminal 140, which is the target in this process, is included in the list. If the terminal 140 is included in the list, the processes in step S406 and its subsequent steps are performed. If the terminal 140 is not included in the list, the information processing apparatus 100 transmits, to the terminal 140, a response indicating that the access is not permitted. In contrast, a list of terminals 140, which are not permitted to access the server 170, among the terminals 140 in the base 190 may be generated in advance. Then, the information processing apparatus 100 may determine whether or not the terminal 140, which is the target in this process, is included in the list. If the terminal 140 is included in the list, the information processing apparatus 100 transmits, to the terminal 140, a response indicating that the access is not permitted. If the terminal 140 is not included in the list, the processes in step S406 and its subsequent steps are performed. The process in step S404 may be skipped. Since it is clear that the process has been performed through the information processing apparatus 100, it is not necessary to determine whether or not the access is permitted.

In step S406, the information processing apparatus 100 transmits, to the CRL distribution server 180, a request for validating the certificate received in step S402. As described above, the certificate is invalid in the normal state. The certificate is validated in response to the request in step S406 in this process.

In step S408, the CRL distribution server 180 validates the certificate, and creates the CRL. Specifically, the certificate of the target terminal 140 is deleted from the CRL, and the certificate is made valid.

In step S410, the information processing apparatus 100 transmits the cloud service request and the certificate to the server 170.

In step S412, the server 170 verifies the client certificate. Specifically, the processes in steps S414 and S416 are performed.

In step S414, the server 170 requests the CRL from the CRL distribution server 180.

In step S416, the CRL distribution server 180 transmits the CRL to the server 170. After that, the server 170 determines whether or not the certificate received in step S410 is included in the obtained CRL. Due to the processes in steps S406 and S408, since the target certificate is not included in the CRL, the server 170 determines that the certificate is valid.

In step S418, the server 170 transmits, to the terminal 140, a response indicating that use of the cloud service is permitted. Thus, the terminal 140 may use the service provided by the server 170.

Figure 5:
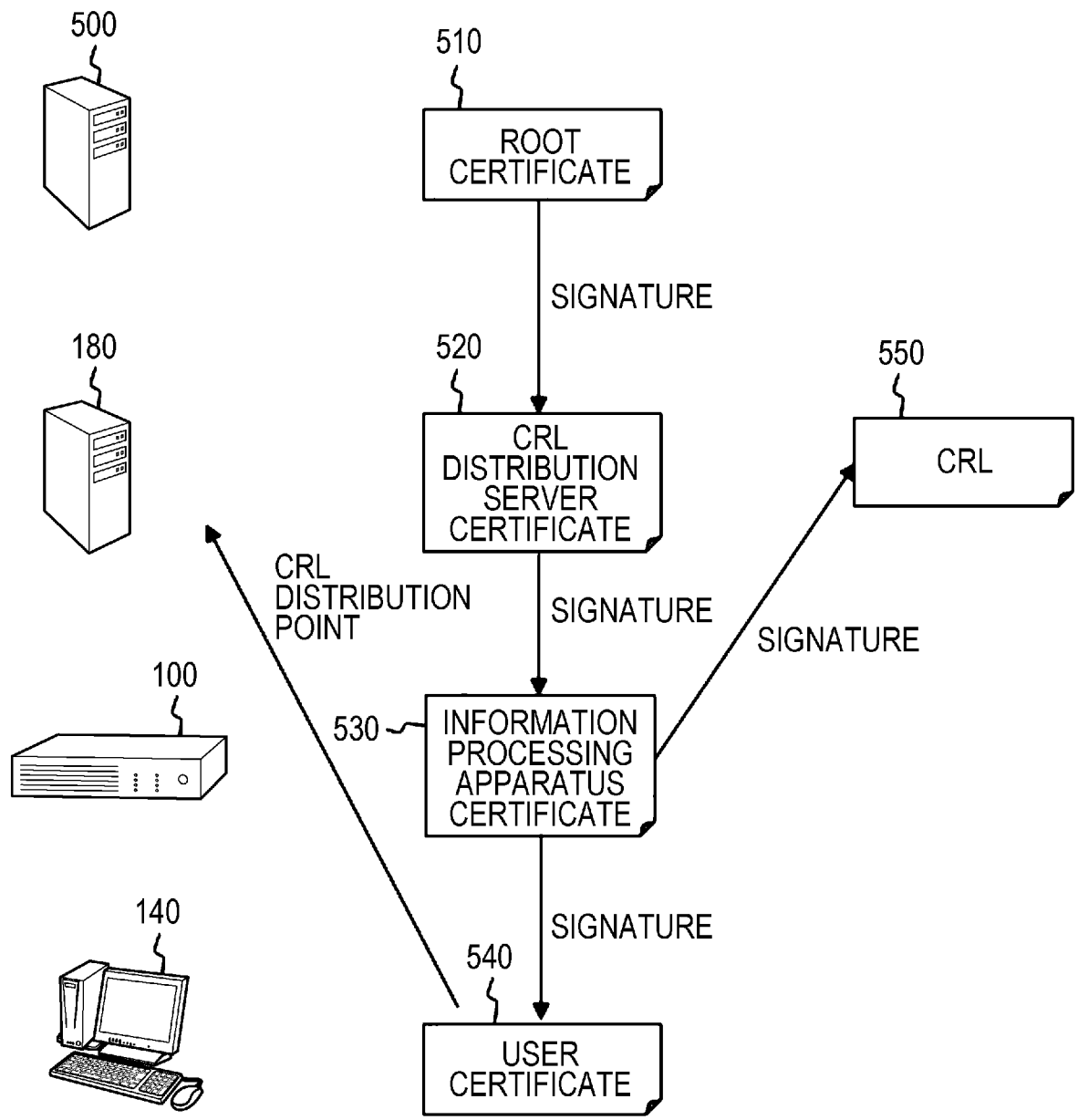
FIG. 5 is a diagram for describing an exemplary process according to the present exemplary embodiment.

FIG. 5 is a diagram for describing an exemplary process according to the present exemplary embodiment. FIG. 5 describes a path of certificates.

The certificates are hierarchized. For example, a CA server 500 signs a root certificate 510 to create a CRL distribution server certificate 520. The CRL distribution server 180 signs the CRL distribution server certificate 520 to create an information processing apparatus certificate 530. The information processing apparatus 100 signs the information processing apparatus certificate 530 to create a user certificate 540. Signing is an encryption process using the secret key of a corresponding apparatus.

A CRL 550 is generated by the CRL distribution server 180 by signing the information processing apparatus certificate 530. The CRL distribution server 180 is set as the CRL distribution point of the user certificate 540.

The procedure of the server 170 verifying the user certificate 540 is as follows.

1. Receive a service request from a terminal 140.
2. Obtain the user certificate 540 from the terminal 140.
3. Verify the user certificate 540.
3-1. Verify the user certificate 540 by using the public key of the information processing apparatus 100.
3-2. Obtain the CRL 550 from the CRL distribution server 180 which is a CRL distribution point of the user certificate 540, and verify the CRL 550 by using the public key of the information processing apparatus 100.
3-3. If the serial number of the user certificate 540 is not included in the CRL 550, determine that the verification has succeeded, that is, determine that the user certificate 540 is valid. If the serial number of the user certificate 540 is included in the CRL 550, determine that the verification has failed, that is, determine that the user certificate 540 is invalid.
4. Verify the certificate (information processing apparatus certificate 530), which is used in issue of the user certificate 540, in a similar procedure. Repeat these processes on higher-level certificates in ascending order of the level.
...
N. Perform the verification up to the certificate (for example, the root certificate 510) which serves as the trust anchor.

In the present exemplary embodiment, the verification result in verification procedure 3-3 indicates validity if the request is transmitted from the terminal 140 located in the base 190, and indicates invalidity if the request is transmitted from the terminal 140 located in the outside of the base 190. That is, a request transmitted not through the information processing apparatus 100 is invalid.

Figure 6:
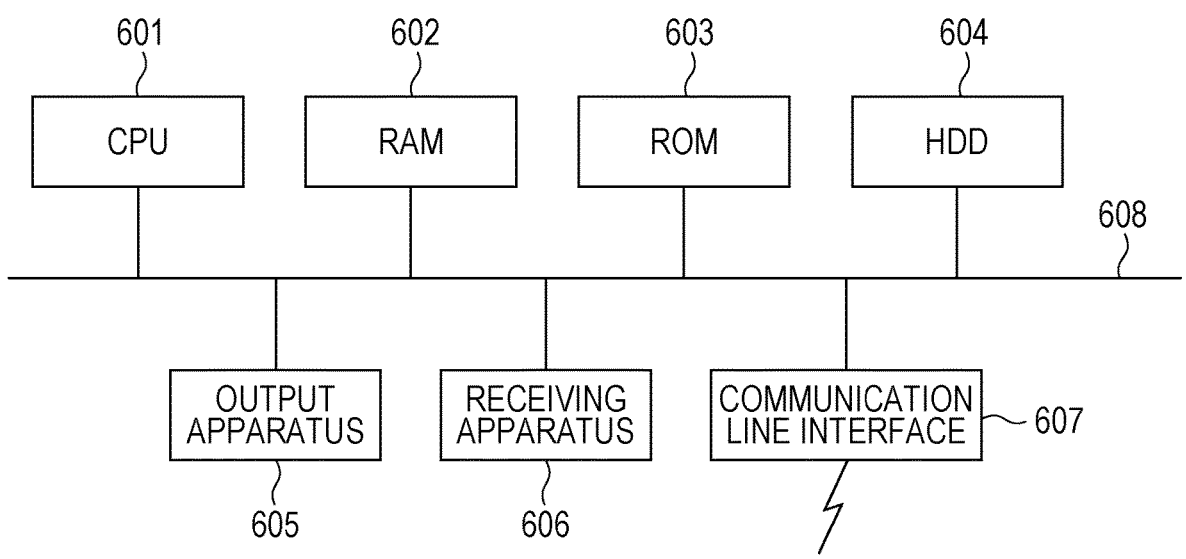
FIG. 6 is a block diagram illustrating an exemplary hardware configuration of a computer implementing the present exemplary embodiment.

As illustrated in FIG. 6, the hardware configuration of a computer executing programs serving as the present exemplary embodiment indicates a typical computer. Specifically, a computer or the like which may function as a personal computer or a server may be used. That is, as a concrete example, a CPU 601 is used as a processor (arithmetic logical unit). A RAM 602, a read-only memory (ROM) 603, and a hard disk drive (HDD) 604 are used as storage devices. As the HDD 604, for example, an HDD and a solid state drive (SSD) which is a flash memory may be used. The computer includes the CPU 601, the RAM 602, the ROM 603, the HDD 604, a receiving apparatus 606, an output apparatus 605, a communication line interface 607, and a bus 608. The CPU 601 executes programs, for example, for the communication (A) module 105, the detection module 110, the verification module 115, the transmission control module 120, the communication (B) module 125, and the validation module 185. The RAM 602 is used to store these programs and data. The ROM 603 is used to store, for example, programs for starting the computer. The HDD 604 is an auxiliary storage device for storing certificates and the like. The receiving apparatus 606 receives data on the basis of users' operations (including a motion, a voice, and the line of sight) on a keyboard, a mouse, a touch screen, a microphone, a camera (including a line-of-sight detecting camera), and the like. Examples of the output apparatus 605 include a liquid-crystal display, an organic light-emitting diode (OLED) display, and a speaker. The communication line interface 607 such as a network interface card is used to connect to a communication network. The bus 608 is used to connect these units to one another for data transfer. Such computers may be connected to each other over a network.

The CRL distribution server 180 may have an additional unit, which distributes the CRL by switching a certificate between valid and invalid, in accordance with a CRL request source (the server 170). Specifically, when the server 170, which has requested the CRL, is a predetermined server 170, the CRL distribution server 180 distributes the CRL corresponding to the server 170. Thus, whether or not a terminal 140 is to be permitted to use the server 170 may be controlled depending on the server 170. Further, validity or invalidity of a certificate is set according to a request from the information processing apparatus 100, enabling security policies to be set for the respective bases.

For an exemplary embodiment which is achieved by using computer programs and which serves as the above-described exemplary embodiment, the computer programs which are software are read into a system having the hardware configuration, and the software and hardware resources cooperate with each other to achieve the above-described exemplary embodiment.

The hardware configuration in FIG. 6 is merely one exemplary configuration. The present exemplary embodiment is not limited to the configuration in FIG. 6, and may have any configuration as long as the modules described in the present exemplary embodiment may be executed. For example, a graphics processing unit (GPU) (including general-purpose computing on graphics processing units (GPGPU)) may be used as a processor. In addition, a subset of the modules may be formed of dedicated hardware, such as an application specific integrated circuit (for example, an application specific integrated circuit (ASIC)) or a reconfigurable integrated circuit (for example, a field-programmable gate array (FPGA)), and a subset of the modules may be installed in an external system connected through a communication line. In addition, systems having the configuration illustrated in FIG. 6 may be connected to each other through communication lines and may cooperate with each other. In particular, the hardware configuration may be installed in portable information communication equipment (including a portable phone, a smartphone, a mobile device, and a wearable computer), home information equipment, a robot, a copier, a fax, a scanner, a printer, a multi-function device (an image processing device having at least two of the functions of scanning, printing, copying, faxing, and the like), or the like as well as a personal computer.

The programs described above may be provided through a recording medium storing the programs, or may be provided through a communication unit. In these cases, for example, the programs described above may be interpreted as a disclosure of "a computer-readable recording medium that stores a program".

The term "a computer-readable recording medium that stores a program" refers to a computer-readable recording medium that stores programs and that is used for, for example, installation and execution of the programs and distribution of the programs.

Examples of the recording medium include a digital versatile disk (DVD) having a format of "DVD-recordable (DVD-R), DVD-rewritable (DVD-RW), DVD-random access memory (DVD-RAM), or the like" which is a standard developed by the DVD forum or having a format of "DVD+recordable (DVD+R), DVD+rewritable (DVD+RW), or the like" which is a standard developed by the DVD+RW alliance, a compact disk (CD) having a format of CD read only memory (CD-ROM), CD recordable (CD-R), CD rewritable (CD-RW), or the like, a Blu-ray™ Disk, a magneto-optical disk (MO), a flexible disk (FD), a magnetic tape, a hard disk, a ROM, an electrically erasable programmable ROM (EEPROM™), a flash memory, a RAM, and a secure digital (SD) memory card.

All or a subset of the above-described programs may be stored and distributed by recording them on the recording medium. In addition, the programs may be transmitted through communication, for example, by using a transmission medium of, for example, a wired network or a wireless communication network which is used for a local area network (LAN), a metropolitan area network (MAN), a wide area network (WAN), the Internet, an intranet, an extranet, and the like, or a combination of these. Alternatively, the programs may be carried on carrier waves.

The above-described programs may be a subset or all of other programs, or may be recorded on a recording medium along with other programs. Alternatively, the programs may be recorded on multiple recording media by dividing the programs. The programs may be recorded in any format, such as compression or encryption, as long as it is possible to restore the programs.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
a hardware processor programmed to:
detect a request for a service submitted from a terminal to an external server providing the service; and
upon a determination that the detected request is submitted from the terminal in a location capable of being managed, transmit a validation request for validating a certificate of the terminal to a certificate-revocation-list distribution server due to the certificate of the terminal being invalid, wherein
a default condition is that the certificate of the terminal is listed in the certificate-revocation-list,
the certificate of the terminal is invalid due to being listed in the certificate-revocation-list,
the request contains an indication to remove the certificate of the terminal from the certificate-revocation-list, and
the validation request is not transmitted upon a determination that the detected request is submitted from the terminal in a location incapable of being managed.

2. The information processing apparatus according to claim 1, wherein the hardware processor is programmed to receive the request and the certificate from the terminal, wherein the received request is detected to be submitted from the terminal to the external server providing the service.

3. The information processing apparatus according to claim 2, wherein the hardware processor is programmed to after the validation request is transmitted to the certificate-revocation-list distribution server, transmit, to the external server, the request and the certificate received from the terminal.

4. The information processing apparatus according to claim 2, wherein the hardware processor is programmed to verify that the terminal is managed by the information processing apparatus using the certificate received from the terminal,
wherein, upon verifying that the terminal is managed by the information processing apparatus, the validation request is transmitted to the certificate-revocation-list distribution server.

5. The information processing apparatus according to claim 1, wherein the hardware processor is programmed to transmit, to the certificate-revocation-list distribution server, an invalidation request for invalidating a certificate of a terminal managed by the information processing apparatus.

6. The information processing apparatus according to claim 5,
wherein, in response to a determination that the certificate of the terminal managed by the information processing apparatus is in an initial state, the invalidation request is transmitted to the certificate-revocation-list distribution server.

7. The information processing apparatus according to claim 5,
wherein, after the service is provided to the terminal by the external server according to the request, the invalidation request is transmitted to the certificate-revocation-list distribution server.

8. A non-transitory computer readable medium storing a program causing a computer to execute a process for information processing, the process comprising:
detecting a request for a service submitted from a terminal to an external server providing the service; and
upon a determination that the detected request is submitted from the terminal in a location capable of being managed, transmitting a validation request for validating a certificate of the terminal to a certificate-revocation-list distribution server due to the certificate of the terminal being invalid, wherein
a default condition is that the certificate of the terminal is listed in the certificate-revocation-list,
the certificate of the terminal is invalid due to being listed in the certificate-revocation-list,
the request contains an indication to remove the certificate of the terminal from the certificate-revocation-list, and
the validation request is not transmitted upon a determination that the detected request is submitted from the terminal in a location incapable of being managed.

9. An information processing apparatus comprising:
means for detecting a request for a service submitted from a terminal to an external server providing the service; and
means for, upon a determination that the detected request is submitted from the terminal in a location capable of being managed, transmitting a validation request for validating a certificate of the terminal to a certificate-revocation-list distribution server due to the certificate of the terminal being invalid, wherein
a default condition is that the certificate of the terminal is listed in the certificate-revocation-list,
the certificate of the terminal is invalid due to being listed in the certificate-revocation-list,
the request contains an indication to remove the certificate of the terminal from the certificate-revocation-list, and
the validation request is not transmitted upon a determination that the detected request is submitted from the terminal in a location incapable of being managed.

* * * * *